(12) United States Patent
Havran et al.

(10) Patent No.: US 10,580,193 B2
(45) Date of Patent: Mar. 3, 2020

(54) METHOD AND APPARATUS FOR RENDERING USING LOCATIONS AND SIZES OF PRIMITIVES

(71) Applicants: SAMSUNG ELECTRONICS CO., LTD., Suwon-si (KR); Czech Technical University Faculty of Electrical Engineering, Prague (CZ)

(72) Inventors: Vlastimil Havran, Prague (CZ); Marek Vinkler, Prague (CZ); Jiri Bittner, Prague (CZ); Wonjong Lee, Seoul (KR)

(73) Assignees: SAMSUNG ELECTRONICS CO., LTD., Suwon-si, Gyeonggi-Do (KR); CZECH TECHNICAL UNIVERSITY FACULTY OF ELECTRICAL ENGINEERING, Prague (CZ)

( * ) Notice: Subject to any disclaimer, the term of this patent is extended or adjusted under 35 U.S.C. 154(b) by 67 days.

(21) Appl. No.: 15/403,612

(22) Filed: Jan. 11, 2017

(65) Prior Publication Data
US 2017/0200303 A1    Jul. 13, 2017

(30) Foreign Application Priority Data
Jan. 11, 2016  (KR) .......................... 10-2016-0003355

(51) Int. Cl.
*G06T 15/06* (2011.01)
*G06T 15/00* (2011.01)
*G06T 17/10* (2006.01)

(52) U.S. Cl.
CPC ............ *G06T 15/06* (2013.01); *G06T 15/005* (2013.01); *G06T 17/10* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 6,539,519 B1 | 3/2003 | Meeker | |
| 8,749,552 B2 * | 6/2014 | Gies | G06T 15/06 345/426 |
| 8,773,422 B1 | 7/2014 | Garland et al. | |
| 8,817,026 B1 * | 8/2014 | Zimmerman | G06T 1/60 345/426 |

(Continued)

OTHER PUBLICATIONS

Morton, Guy M. *A Computer Oriented Geodetic Data Base and a New Technique in File Sequencing*. New York: International Business Machines Company, 1966. (20 pages, in English).

(Continued)

*Primary Examiner* — Hilina K Demeter
(74) *Attorney, Agent, or Firm* — F. Chau & Associates, LLC

(57) ABSTRACT

A graphics processing method and apparatus includes determining locations of primitives in a 3-dimensional (3D) space from graphics data for the 3D space in a memory, determining sizes of the primitives, generating Morton codes comprising a piece of information indicating the locations of the primitives and a piece of information indicating the sizes of the primitives, classifying the primitives into bounding boxes using the piece of information indicating the sizes of the primitives, and generating the acceleration structure indicating an inclusion relationship between the bounding boxes.

14 Claims, 12 Drawing Sheets

(56) References Cited

U.S. PATENT DOCUMENTS

| | | | | |
|---|---|---|---|---|
| 9,224,235 | B2* | 12/2015 | Sevastiyanov | G06T 15/06 |
| 9,582,607 | B2* | 2/2017 | Laine | G06F 16/9027 |
| 10,019,832 | B2* | 7/2018 | Park | G06T 15/06 |
| 2008/0192050 | A1* | 8/2008 | Schardt | G06T 15/06 |
| | | | | 345/421 |
| 2009/0167763 | A1* | 7/2009 | Waechter | G06T 15/06 |
| | | | | 345/426 |
| 2010/0239185 | A1* | 9/2010 | Fowler | G06T 15/06 |
| | | | | 382/291 |
| 2011/0080403 | A1* | 4/2011 | Ernst | G06T 15/06 |
| | | | | 345/420 |
| 2012/0313944 | A1 | 12/2012 | Kontkanen et al. | |
| 2013/0033507 | A1 | 2/2013 | Garanzha et al. | |
| 2013/0113800 | A1* | 5/2013 | McCombe | G06T 15/06 |
| | | | | 345/424 |
| 2014/0362074 | A1* | 12/2014 | Karras | G06T 15/06 |
| | | | | 345/419 |
| 2015/0138202 | A1* | 5/2015 | Lee | G06T 15/06 |
| | | | | 345/426 |
| 2015/0302629 | A1* | 10/2015 | Obert | G06T 15/06 |
| | | | | 345/426 |

OTHER PUBLICATIONS

Gu, Yan, et al. "Efficient BVH construction via approximate agglomerative clustering." *Proceedings of the 5th High-Performance Graphics Conference.* ACM, 2013. (8 pages, in English).

Karras, Tero. "Maximizing Parallelism in the Construction of BVHs, Octrees, and K-D Trees." *Proceedings of the Fourth ACM SIGGRAPH/ Eurographics Conference on High-Performance Graphics.* Eurographics Association, 2012. (5 pages, in English).

Wald, Ingo. "On Fast Construction of SAH-Based Bounding Volume Hierarchies." *2007 IEEE Symposium on Interactive Ray Tracing.* IEEE, 2007. (8 pages, in English).

Garanzha, Kirill, et al. "Simpler and Faster HLBVH With Work Queues." *Proceedings of the ACM SIGGRAPH Symposium on High Performance Graphics.* ACM, 2011. (6 pages, in English).

\* cited by examiner

METHOD AND APPARATUS FOR RENDERING USING LOCATIONS AND SIZES OF PRIMITIVES

CROSS-REFERENCE TO RELATED APPLICATION

This application claims the benefit under 35 USC § 119(a) of Korean Patent Application No. 10-2016-0003355, filed on Jan. 11, 2016, in the Korean Intellectual Property Office, the entire disclosure of which is incorporated herein by reference for all purposes.

BACKGROUND

1. Field

The following description relates to methods and apparatuses for generating an acceleration structure for ray tracing.

2. Description of Related Art

Three-dimensional (3D) rendering is an image processing procedure of synthesizing 3D object data into an image seen from a view point of a camera. Ray tracing is a process of tracing intersection points where rays intersect scene objects that are rendering targets. Ray tracing may include a process of traversing an acceleration structure and a process of conducting an intersection test between a ray and a primitive. Current computing technologies, which are particularly used to perform such rendering, may fail to adequately render targets or perform renderings because of the large computational amount and a great memory bandwidth that are required by the traversals of an acceleration structure and intersection tests. An example reason why current computing technologies fail is the similar failure of related computing technologies that are particularly used to generate such acceleration structures.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Provided are methods and apparatuses that may quickly generate an acceleration structure for ray tracing while maintaining the quality of the acceleration structure.

Additional aspects will be set forth in part in the description which follows and, in part, will be apparent from the description, or may be learned by practice of the presented embodiments.

In one general aspect, a graphics processing method includes determining locations of primitives in a 3-dimensional (3D) space from graphics data for the 3D space in a memory, determining sizes of the primitives, generating Morton codes each comprising a piece of information indicating the locations of respective primitives and a piece of information indicating the sizes of respective primitives, classifying the primitives into bounding boxes using the piece of information indicating the sizes of the respective primitives, and generating an acceleration structure indicating an inclusion relationship between the bounding boxes.

The classifying of the primitives may include classifying the primitives having sizes greater than a critical value into first bounding boxes and primitives having sizes less than the critical value into second bounding boxes.

The determining of the sizes of the primitives may include determining respective sizes of the bounding boxes, and indicating the sizes of the primitives based on the respective sizes of the bounding boxes. The determining of the sizes of the bounding boxes may include calculating respective diagonal lengths of the bounding boxes, and determining the respective sizes of the bounding boxes based on the respective diagonal lengths.

One of the pieces of information indicating the sizes of the respective primitives may include a binary bit in binary numbers indicating the sizes of the respective primitives. In the classifying of the primitives into the bounding boxes, the primitives may be classified into the first bounding box comprising primitives of which the binary bit may be 1 and the second bounding box comprising primitives of which the at least one binary bit may be 0. The generating of the acceleration structure may include generating a first node corresponding to the first bounding box, generating a second node corresponding to the second bounding box, and adding the first and second nodes to the acceleration structure as a child node of a third node corresponding to the 3D space. The determining of the locations of the primitives may include determining x-axis, y-axis, and z-axis coordinates of the primitives within the 3D space, and the piece of information indicating the locations of the primitives may include a binary bit in a binary number indicating the x-axis coordinates, a binary bit in a binary number indicating the y-axis coordinates, and a binary bit in a binary number indicating the z-axis coordinates. The Morton codes may be generated by combining, in order, the binary bit in the binary number indicating the x-axis coordinates, the binary bit in the binary number indicating the y-axis coordinates, the binary bit in the binary number indicating the z-axis coordinates, and the binary bit in the binary number indicating the sizes of the primitives.

The method may further include accelerating a ray tracing of an object in the 3D space by traversing and performing an intersection test of the generated acceleration structure.

In another general aspect, a non-transitory computer-readable recording medium storing instructions that, when executed by one or more processors, may cause the one or more processors to perform the graphics processing method.

In another general aspect, a graphics processing apparatus includes a memory configured to store graphics data for a 3-dimensional (3D) space, and a processor configured to determine locations of primitives in the 3D space from the graphics data for the 3D space in a memory, determine sizes of the primitives, generate Morton codes each comprising a piece of information indicating the locations of respective primitives and a piece of information indicating sizes of the respective primitives, classify the primitives into bounding boxes based on the pieces of the information indicating the sizes of the respective primitives, and generate an acceleration structure indicating an inclusion relationship between the bounding boxes.

The processor may be further configured to classify the primitives in the 3D space into first bounding boxes comprising primitives having a size greater than a critical value and second bounding boxes comprising primitives having a size less than the critical value. The processor may be further configured to determine sizes of the first or second, or both, bounding boxes and indicate the sizes of the primitives based on the sizes of the first or second, or both, bounding boxes. The processor may be further configured to calculate diagonal lengths of the first or second, or both, bounding boxes and determine the sizes of the first or second, or both, bounding boxes based on the diagonal lengths.

The piece of information indicating the sizes of the primitives may include a binary bit in binary numbers indicating the sizes of the primitives. The processor may be further configured to classify the primitives into the first bounding box comprising primitives of which the binary bit is 1 and the second bounding box comprising primitives of which the at least one binary bit is 0. The processor may be further configured to generate a first node corresponding to the first bounding box, generate a second node corresponding to the second bounding box, and add the first and second nodes to the acceleration structure as a child node of a third node corresponding to the 3D space. The processor may be further configured to determine x-axis, y-axis, and z-axis coordinates of the primitives within the 3D space, and the piece of information indicating the locations of the primitives may include a binary bit in binary number indicating the x-axis coordinates, a binary bit in binary number indicating the y-axis coordinates, and a binary bit in binary number indicating the z-axis coordinates. The processor may be further configured to generate the Morton codes by combining, in order, the binary bit in the binary number indicating the x-axis coordinates, the binary bit in the binary number indicating the y-axis coordinates, the binary bit in the binary number indicating the z-axis coordinates, and the binary bit in the binary number indicating the sizes of the primitives.

The processor may be further configured to accelerate a ray tracing of an object in the 3D space by traversing and performing an intersection test of the generated acceleration structure.

The apparatus may be a graphics processing unit (GPU) and further comprises one or more rendering cores.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
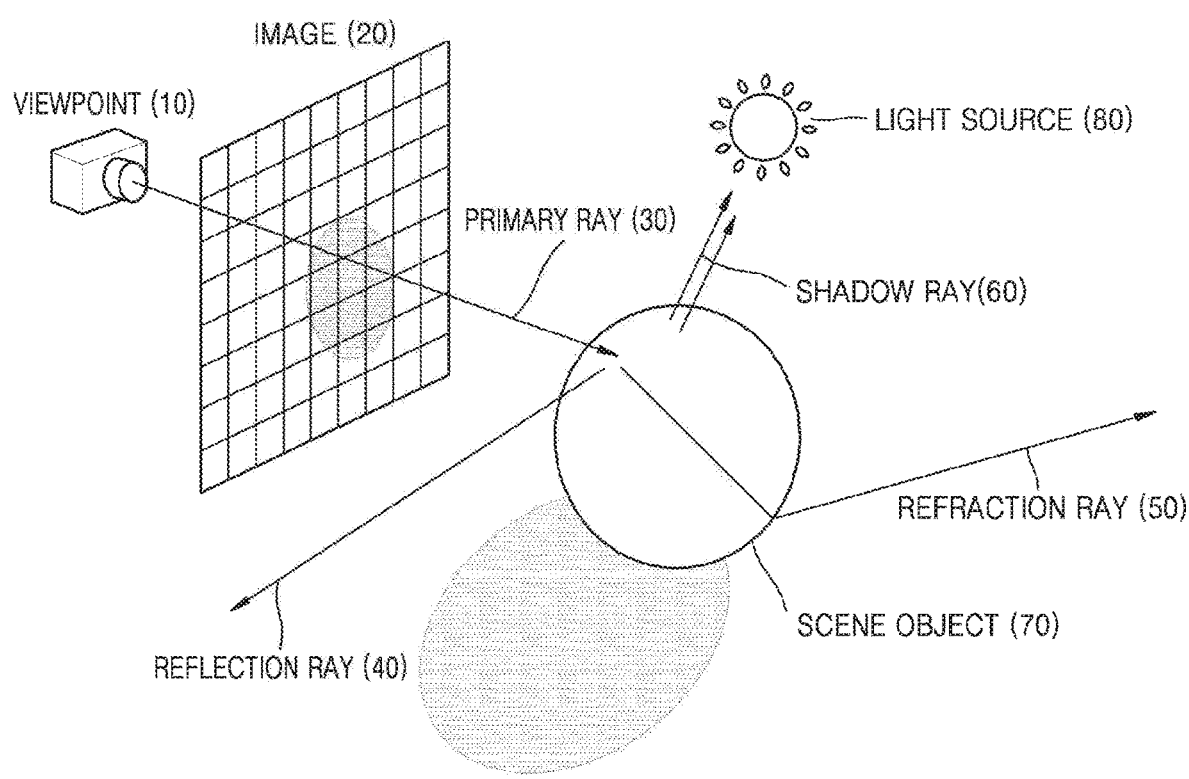
FIG. 1 is a schematic illustration of ray tracing according to an embodiment.

FIG. 1 is a schematic view to explain ray tracing according to an embodiment. Referring to FIG. 1, in a three-dimensional (3D) modeling example, a ray tracing core may determine a viewpoint 10 and an image 20 according to the viewpoint 10. When the viewpoint 10 and the image 20 are determined, the ray tracing core generates a ray from the viewpoint 10 with respect to each pixel of the image 20.

Ray tracing elements include a primary ray 30, a scene object 70, a reflection ray 40, a refraction ray 50, a shadow ray 60, and a light source. The primary ray 30 is generated from the viewpoint 10. The primary ray 30 intersects the scene object 70 after passing through the image 20. At an intersection point between the primary ray 30 and the scene object 70, the reflection ray 40 and the refraction ray 50 are generated. Also, the shadow ray 60 is generated at the intersection point toward the light source 80. The reflection ray 40, the refraction ray 50, and the shadow ray 60 are referred to as secondary rays. The scene object 70 denotes an object that is to be rendered with respect to the image 20. The scene object 70 includes a plurality of primitives.

The ray tracing core analyzes the primary ray 30, the secondary rays, that is, the reflection ray 40, the refraction ray 50, and the shadow ray 60, and rays derived from the secondary rays. The ray tracing core determines a color value of each of pixels that form the image 20 based on an analysis result. The ray tracing core determines color values of pixels by considering characteristics of the scene object 70.

Figure 2:
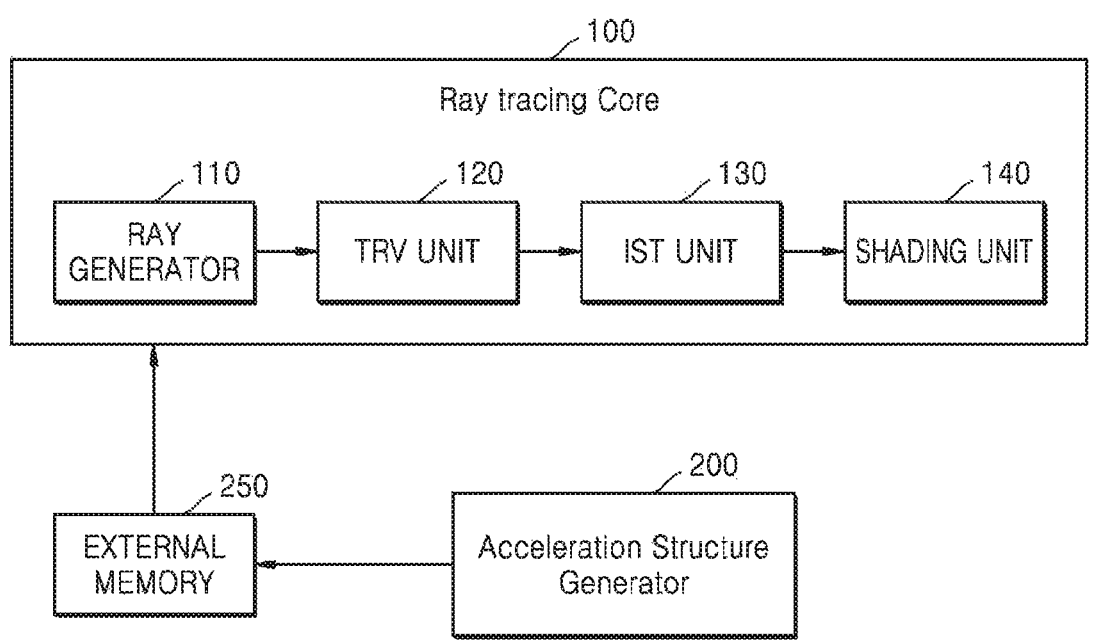
FIG. 2 is a diagram illustrating an example of a ray tracing apparatus that includes a ray tracing core according to an embodiment.

FIG. 2 is a schematic view of a ray tracing apparatus that includes a ray tracing core 100, according to an embodiment. As only an example, the ray tracing apparatus may be a graphics processing unit (GPU). Referring to FIG. 2, the ray tracing core 100 includes a ray generator 110, a traversal (TRV) unit 120, an intersection test (IST) unit 130, and a shading unit 140. In FIG. 2, the TRV unit 120 and the IST unit 130 are included in the ray tracing core 100, but the TRV unit 120 and the IST unit 130 may also be included as separate hardware from the ray generator 110 and shading unit 140, such as respective one or more processors or circuits, or any combination thereof. The ray tracing core 100 illustrated in FIG. 2 refers to only elements related to the present discussion. However, it will be obvious to one of ordinary skill in the art, after an understanding of the present description, that other general-use elements than the illustrated ones in FIG. 2 may be further included in the ray tracing core 100.

The ray tracing core 100 traces an intersection point between generated rays and objects located in 3D space, and determines color values of pixels that form an image. In other words, the ray tracing core 100 searches for an intersection point between rays and objects, generates a secondary ray according to characteristics of an object at the intersection point, and determines a color value of the intersection point.

The ray tracing core 100 may use results of previous traversal and previous intersection tests in traversal of an acceleration structure and an intersection test. That is, the ray tracing core 100 may perform current rendering faster by applying results obtained from a previous rendering to the current rendering.

The ray generating unit 110 generates a primary ray and a secondary ray. The ray tracing core 100 generates a first ray from a viewpoint. The ray generating unit 110 generates a reflection, refraction, or shadow secondary ray at an intersection point between the primary ray and an object. Also, another secondary ray may be generated at an intersection point between the above secondary ray and the object. The ray generating unit 110 may generate a reflection ray, a refraction ray or a shadow ray within a preset number of times, or may determine the number of times generating a reflection ray, a refraction ray, or a shadow ray according to characteristics of an object.

The TRV unit 120 may be a processing unit that receives information about a ray generated by the ray generating unit 110. The generated ray may be a primary ray, a secondary ray, or a ray derived from the secondary ray. For example, regarding a primary ray, the TRV unit 120 may receive information about a viewpoint and a direction of a generated ray. Also, regarding a secondary ray, the TRV unit 120 may receive information about a starting point and a direction of a secondary ray. A starting point of a secondary ray denotes a point which a primary ray has hit or intersects an object. A viewpoint or a starting point may be expressed by coordinates, and a direction may be expressed by a vector.

The TRV unit 120 reads information about an acceleration structure from an external memory 250. An acceleration structure is generated by an acceleration structure generating apparatus 200, and the generated acceleration structure is stored in the external memory 250. An acceleration structure refers to a structure including position information of objects in 3D space. For example, an acceleration structure may be a K-dimensional (KD) tree or a bounding volume hierarchy (BVH).

The TRV unit 120 traverses an acceleration structure to output an object or a leaf node of the acceleration structure that a ray has hit. For example, the TRV unit 120 searches for nodes included in an acceleration structure to output a leaf node which a ray has hit from among lowermost-ranking leaf nodes, to the IST unit 130. In other words, the TRV unit 120 determines which of bounding boxes that form an acceleration structure is hit by a ray. The TRV unit 120 determines which object included in a bounding box is hit by a ray. Information about a hit object is stored in a TRV cache of the ray tracing core 100, e.g., also represented by the TRV unit 120. A bounding box may denote a unit including a plurality of objects or a plurality of primitives and may be expressed in different forms according to an acceleration structure. A TRV cache denotes a memory for temporarily storing data used by the TRV unit 120 in traversal.

The TRV unit 120 may traverse an acceleration structure based on results of previous rendering. The TRV unit 120 may traverse an acceleration structure via the same route as previous rendering based on the result of previous rendering that is stored in a TRV cache. For example, when the TRV unit 120 traverses an acceleration structure regarding a generated ray, the TRV unit 120 may traverse a bounding box that is hit by a previous ray having the same viewpoint and the same direction as the generated ray. Also, the TRV unit 120 may traverse an acceleration structure by referring to a search route with respect to a previous ray.

The IST unit 130 may be a processor that receives an object or a leaf node that is hit by a ray, from the TRV unit 120 and reads information from the external memory 250 about primitives included in a hit object or leaf node. Information about the read primitives may be stored in an IST cache of the ray tracing core 100, e.g., also represented by the IST unit 100. An IST cache denotes a memory to temporarily store data used by the IST unit 130 in an intersection test.

The IST unit 130 conducts an intersection test between a ray and a primitive to output a primitive hit by a ray and an intersection point. The IST unit 130 receives information from the TRV unit 120 about which object is hit by a ray and tests which primitives from among a plurality of primitives included in a hit object are hit by a ray. After the IST unit 130 finds a primitive hit by a ray, the IST unit 130 outputs an intersection point indicating which point of the hit primitive intersects the ray. The intersection point may be output to the shading unit 140 in coordinates.

The IST unit 130 may conduct an intersection test by using results of previous rendering. The IST unit 130 may conduct an intersection test on the same primitive as that of previous rendering based on results of previous rendering that are stored in the IST cache. For example, when the IST unit 130 conducts an intersection test between a generated ray and a primitive, the IST unit 130 may conduct an intersection test on a primitive hit by a previous ray having the same viewpoint and the same direction as the generated ray. Thus, the IST unit 130 may apply the result for the previous ray for determining an intersection of the current ray instead of conducting a new intersection test.

The shading unit 140 determines a color value of a pixel based on information about an intersection point, received from the IST unit 130, and properties of a material of the intersection point. The shading unit 140 determines a color value of a pixel by considering a basic color of a material of the intersection point and effects due to a light source.

The ray tracing core 100 receives from the external memory 250 of the ray tracing apparatus data needed in ray tracing. An acceleration structure generated by the acceleration structure generating unit 200 or geometry data indicating information about primitives is stored in the external memory 250. A primitive may be a polygon such as a triangle or a rectangle, and geometry may indicate information about a vertex and a position of primitives included in an object.

The acceleration structure generating apparatus 200 of the ray tracing apparatus generates an acceleration structure including position information about objects in 3D space. The acceleration structure generating apparatus 200 may generate various types of acceleration structures. For example, an acceleration structure may be generated by splitting 3D space in a hierarchical tree structure, and the acceleration structure generating apparatus 200 may generate a structure indicating a relationship between objects in 3D space by applying BVH or KD tree. The acceleration structure generating apparatus 200 may determine a maximum number of primitives of a leaf node and a depth of tree and generate an acceleration structure based on the determined maximum number and the determined depth of tree. The acceleration structure generating apparatus 200 may be included with the ray tracing apparatus or separate.

Figure 3:
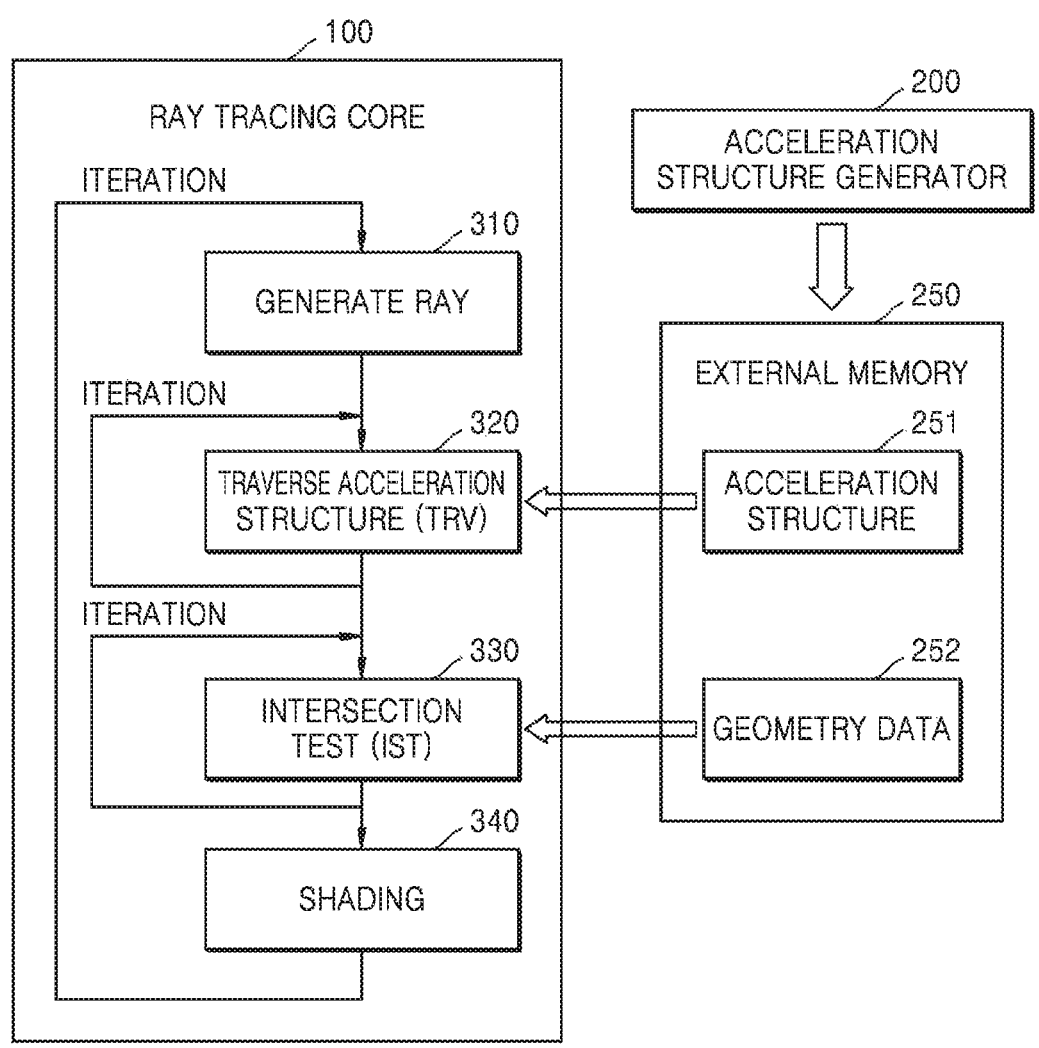
FIG. 3 is a diagram illustrating a method of performing ray tracing by a ray tracing core according to an embodiment.

FIG. 3 is a diagram illustrating a method of ray tracing performed by a ray tracing core. For example, the ray tracing core may have the structure of the ray tracing core 100 shown in FIG. 2. Accordingly, descriptions above of the ray tracing core 100 also apply to the ray tracing of FIG. 3.

In operation 310, the ray tracing core 100 generates a ray. The ray tracing core 100 generates a primary ray, a secondary ray, and rays derived from the secondary ray.

In operation 320, the ray tracing core 100 traverses an acceleration structure read out from the external memory 250. The ray tracing core 100 detects a bounding box hit or intersected by a ray, by traversing the acceleration structure 251 based on a viewpoint and a direction of generated rays and detects an object hit by a ray from among objects included in the hit bounding box. The ray tracing core 100 repeats traversing the acceleration structure 251 until a hit object is detected. For example, the ray tracing core 100 traverses an acceleration structure along a predetermined route, and when a leaf node on the searched route is not hit by a ray, the ray tracing core 100 traverses other routes in an acceleration structure.

The ray tracing core 100 may sequentially traverse all routes but may traverse a predetermined route based on search information of a previous ray. For example, the ray tracing core 100 searches for a route in which a hit leaf node is included in a previous node when the previous ray has the same or similar viewpoint and the same or similar direction as a current ray.

In operation 330, the ray tracing core 100 conducts an intersection test based on geometry data 252 of primitives read out from the external memory 250. The ray tracing core 100 iterates an intersection test until a hit primitive is detected. For example, the ray tracing core 100 conducts an intersection test on a primitive, and when any primitive is hit by a ray, the ray tracing core 100 conducts an intersection test on another primitive.

The ray tracing core 100 may sequentially conduct an intersection test on all primitives but may also prioritize a test of a predetermined primitive based on information about an intersection test of a previous ray. For example, the ray tracing core 100 may conduct an intersection tests on primitives by prioritizing a primitive that is hit by a previous ray when the previous ray and a current ray have the same or similar viewpoint and the same or similar direction.

In operation 340, the ray tracing core 100 conducts shading of a pixel based on the intersection test. After operation 340 is completed, the ray tracing core 100 proceeds to operation 310. The ray tracing core 100 iterates operations 310 through 340 with respect to all pixels that form an image.

Embodiments of the methods described herein may control one or more processors to implement operations related to ray tracing and generation of acceleration structures, as well as other respective operations described herein.

Figure 4:
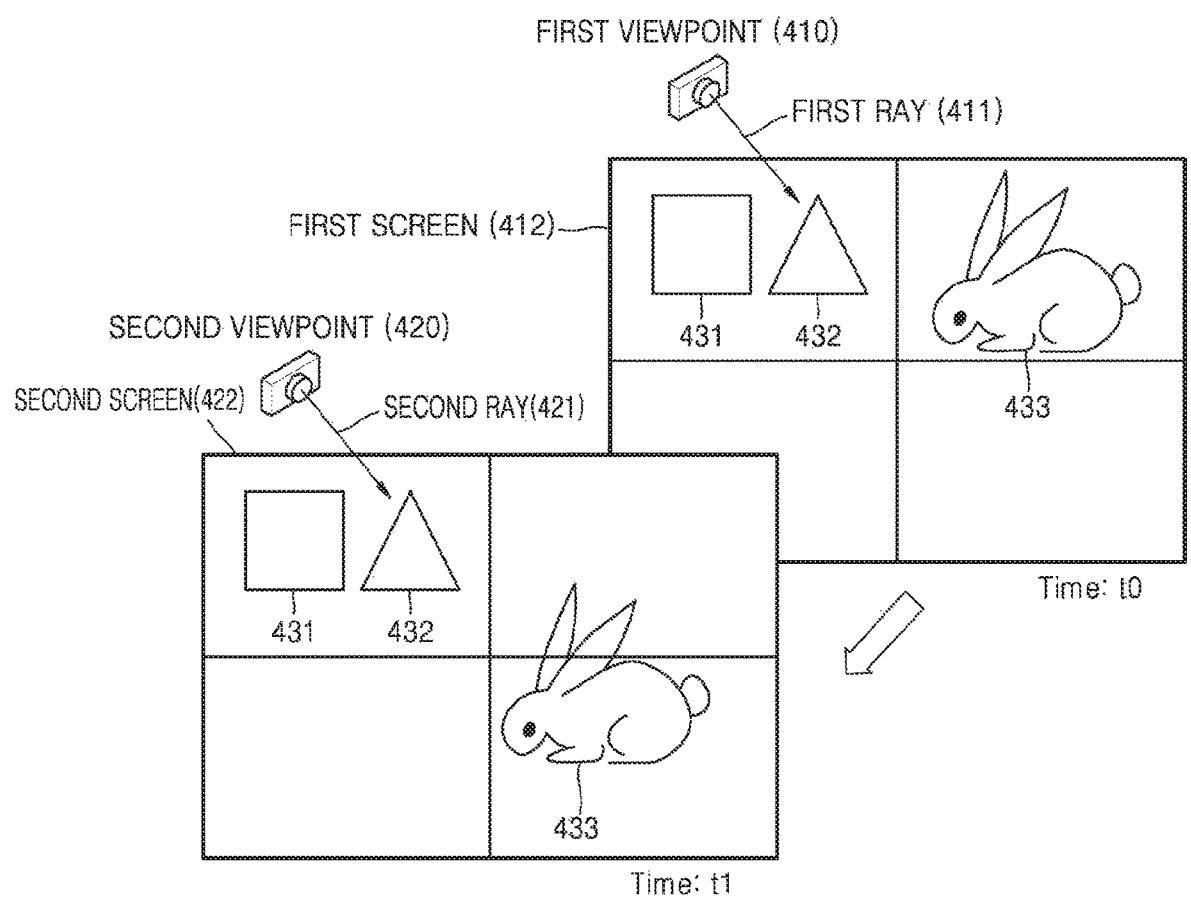
FIG. 4 is a diagram illustrating a method of accelerating ray tracing according to an embodiment.

FIG. 4 is a diagram illustrating a method of accelerating ray tracing. Referring to FIG. 4, a first image 412 is an image that is rendered at t=0, and a second image 422 is an image that is rendered at t=1. As a rabbit 433 only moves in the first image 412 and the second image 422 and a rectangle 431 and a triangle 432 do not move, the first image 412 and the second image 422 are similar to each other.

Accordingly, the ray tracing core 100 may conduct rendering with respect to the second image 422 by using a result of rendering the first image 412. For example, when a first viewpoint 410 and a second viewpoint 420 are at the same position, and a first ray 411 and a second ray 421 are in the same direction, the ray tracing core 100 may accelerate ray tracing of the second ray 421 by applying a result of ray tracing with respect to the first ray 411. For example, the TRV unit 120 of the ray tracing core 100 traverses a bounding box hit by the first ray 411 when conducting a search with respect to the second ray 421. Also, the IST unit 130 of the ray tracing core 100 conducts an intersection test on a triangle 432 hit by the first ray 411 during an intersection test on the second ray.

Figure 5:
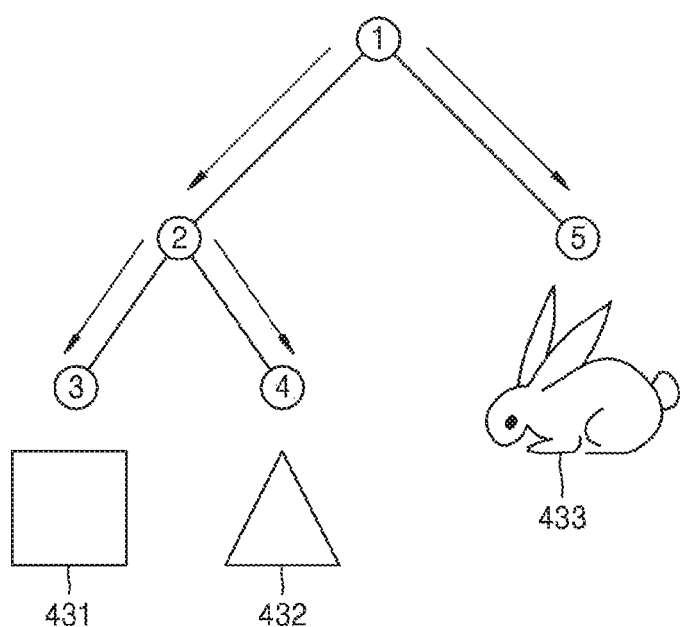
FIG. 5 is a diagram illustrating a method of accelerating the ray tracing of FIG. 4 according to an embodiment.

FIG. 5 is another schematic view illustrating a method of accelerating ray tracing. Referring to FIG. 5, an acceleration structure includes five nodes, node 1 through 5, wherein nodes 3 through 5 each are a leaf node.

The TRV unit 120 search an acceleration structure along three routes. First, the TRV unit 120 may traverse an acceleration structure along node 1, node 2, and node 3 which form a first route. Secondly, the TRV unit 120 may traverse an acceleration structure along node 1, node 2, and node 4, which form a second route. Thirdly, the TRV unit 120 may traverse an acceleration structure along node 1 and node 5 which form a third route. When the TRV unit 120 conducts a search with respect to the second ray 421, the TRV unit 120 traverses the second route via which a triangle 432 hit by the first ray 411 is searched. Accordingly, the TRV unit 120 omits an operation of traversing the first route and/or the third route.

Figure 6:
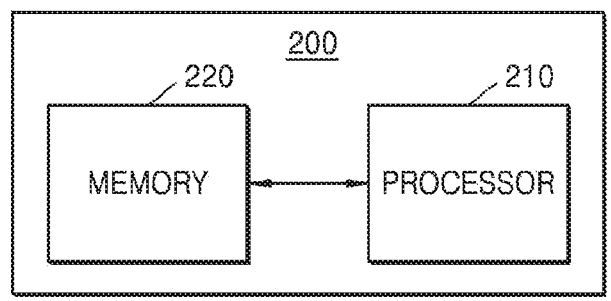
FIG. 6 is a block diagram of an apparatus for generating an acceleration structure according to an embodiment.

FIG. 6 is a block diagram of an apparatus 200 for generating an acceleration structure according to an embodiment. Though the apparatus 200 of FIG. 6 may correspond to the acceleration structure generator 200 of FIG. 2, embodiments are not limited to the same.

Referring to FIG. 6, the apparatus 200 for generating an acceleration structure includes a processor 210 and a memory 220. The apparatus 200 for generating an acceleration structure includes the memory 220 in which information for the acceleration structure is stored, such as information used to generate the acceleration structure and the resulting acceleration structure and any further derived information. The information about the acceleration structure may include information about the 3D space to be indicated by the acceleration structure. For example, the apparatus 200 for generating an acceleration structure may be a graphic processing unit (GPU).

The processor 210 determines locations of primitives included in the 3D space. The processor 210 may determine x-axis, y-axis, and z-axis coordinates within the 3D space including the primitives.

The processor 210 may divide the 3D space into grids. For example, the processor 210 may divide the 3D space into grids at uniform intervals along the x-axis, y-axis, and z-axis.

The locations of the primitives may be expressed at locations in the grids including the primitives. When the primitives are included in the grids, the locations of the primitives may be expressed at the locations of the grids including central points of the primitives. A detailed method of determining and expressing the locations of the primitives will be described with reference to FIGS. 8 and 9 below.

Also, the processor 210 may determine sizes of the primitives. The processor 210 determines the sizes of the primitives by calculating averages of respective lengths of edges of the primitives. The processor 210 determines the averages of the lengths of the edges of the primitives as the sizes of the primitives. In another embodiment, the processor 210 may indicate the sizes of the primitives by calculating a surface area of the primitives. The processor 210 determines the surface area of the primitives as the sizes of the primitives.

The processor 210 may determine a size of a bounding box including the primitive. For example, the processor 210 may calculate a diagonal length of the bounding box including the primitive. The processor 210 may determine the diagonal length of the bounding box including the primitive as the size of the primitive.

Also, the processor 210 may generate Morton codes including at least one piece of information indicating the sizes of the primitives and at least one piece of information indicating the sizes of the primitives.

The locations of the primitives may be expressed as binary coordinates. In this case, the at least one piece of the information indicating the locations of the primitives denotes one or more binary bits included in the binary coordinates indicating the locations of the primitives.

In detail, the processor 210 may determine the axis, y-axis, and z-axis coordinates of the primitives within the 3D space. In this case, the at least one piece of the information indicating the locations of the primitives includes one or more binary bits included in binary numbers indicating x-axis coordinates, one or more binary bits included in binary numbers indicating y-axis coordinates, and one or more binary bits included in binary numbers indicating z-axis coordinates. The sizes of the primitives may also be expressed as binary numbers. In this case, the at least one piece of the information indicating the sizes of the primitives means one or more binary bits included in binary numbers indicating the sizes of the primitives.

The processor 210 may generate Morton codes by combining, in a predetermined order, the binary bits included in the binary numbers indicating the x-axis coordinates of the primitives, the binary bits included in the binary numbers indicating the y-axis coordinates of the primitives, the binary bits included in the binary numbers indicating the z-axis coordinates of the primitives, and the binary bits included in the binary numbers indicating the sizes of the primitives. The order in which the binary bits are combined to generate the Morton codes may be changed according to distributions of the primitives included in the 3D space. Also, the number of the binary bits indicating the x-axis coordinates, the y-axis coordinates, the z-axis coordinates, and the sizes of the primitives used to generate the Morton codes may be differently set.

The processor 210 may divide the 3D space by using the Morton codes. For example, the processor 210 may divide the 3D space by using a linear bounding volume hierarchy (LBVH) or advanced audio coding (AAC) method, but algorithms for dividing the 3D space are not limited thereto.

The processor 210 may classify the primitives into the bounding boxes based on at least one piece of the information indicating the sizes of the primitives. For example, the processor 210 classifies the primitives into a set of primitives having a size greater than a predetermined critical size and a set of primitives having a size smaller than the predetermined critical size.

The processor 210 classifies the primitives by using two bounding boxes including the classified primitives. For example, the processor 210 classifies the primitives into a bounding box including the primitives having the size greater than the predetermined size and a bounding box including the primitives having the size smaller than the predetermined critical size.

Also, the processor 210 generates an acceleration structure including an inclusion relationship between the bounding boxes. In this case, the bounding boxes respectively correspond to nodes included in the acceleration structure. For example, the processor 210 classifies the primitives into a first bounding box including primitives of which a binary bit is equal to 1 and a second bounding box including primitives of which a binary bit is equal to 0. The processor 210 generates a first node corresponding to the first bounding box and a second node corresponding to the second bounding box. Each of the nodes include a data structure such as a struct, a union, and a class, but is not limited thereto.

The processor 210 may add the first node and the second node to the acceleration structure as a child node of a third node corresponding to the 3D space. In the acceleration structure, a bounding box corresponding to a parent node may include a bounding box corresponding to a child node. Each bounding box may be divided into two bounding boxes. Accordingly, the acceleration structure may be in a binary tree form.

Figure 7:
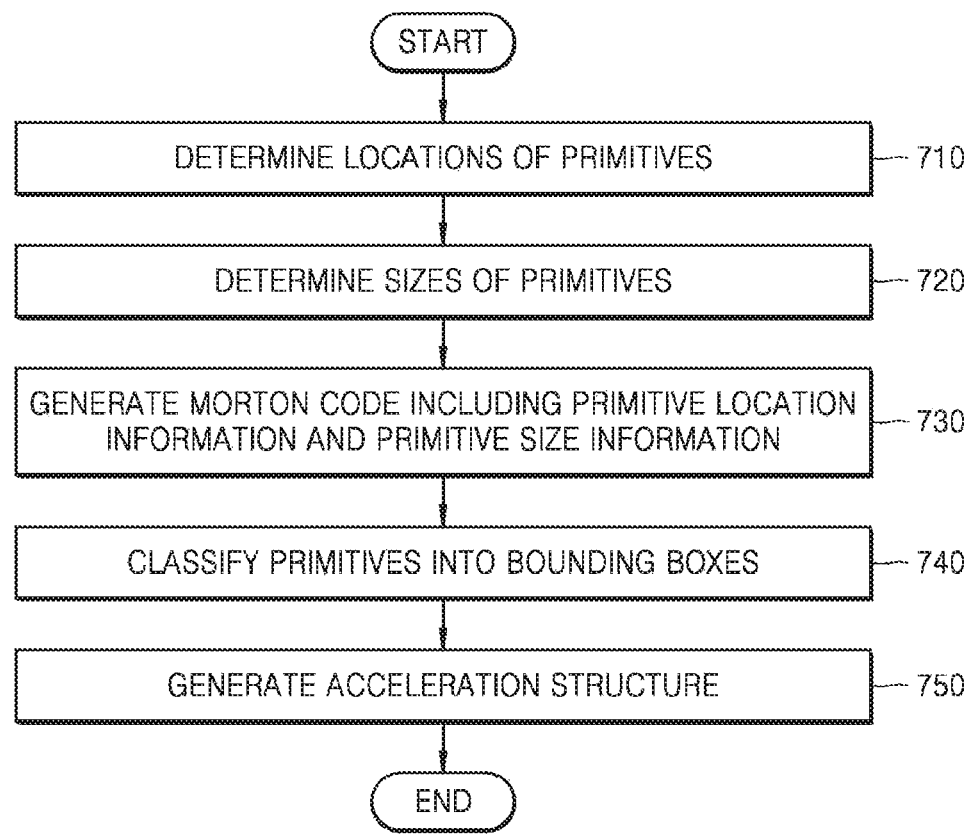
FIG. 7 is a flowchart illustrating a method of generating an acceleration structure according to an embodiment.

FIG. 7 is a flowchart illustrating a method of generating an acceleration structure according to an embodiment. Though the method of generating the acceleration structure will be explained as being performed by the apparatus 200 of FIGS. 2 and/or 6 for generating an acceleration structure according to one or more embodiments, embodiments are not limited to the same. As an example, each operation of the method of generating the acceleration structure of FIG. 7 corresponds to an operation of the apparatus 200 of FIG. 6 for generating an acceleration structure, though embodiments are not limited to the same.

In operation 710, the apparatus 200 for generating an acceleration structure determines locations of primitives. The apparatus 200 for generating an acceleration structure determines x-axis, y-axis, and z-axis coordinates, for example, of the primitives within a 3D space.

In operation 720, the apparatus 200 for generating an acceleration structure determines sizes of primitives. The apparatus 200 for generating an acceleration structure determines sizes of bounding boxes including the primitives. The apparatus 200 for generating an acceleration structure indicates the sizes of the primitives based on the sizes of the bounding boxes. The apparatus 200 for generating an acceleration structure determines the sizes of the bounding boxes as the sizes of the primitives.

For example, the apparatus 200 for generating an acceleration structure may calculate a diagonal length of the bounding box. The apparatus 200 for generating an acceleration structure may determine the size of the bounding box based on the diagonal length thereof. In this case, the apparatus 200 for generating an acceleration structure indicates the diagonal length of the bounding box as the size of the primitive. Thus, the apparatus 200 for generating an acceleration structure determines the diagonal length of the bounding box as the size of the primitive.

In operation 730, the apparatus 200 for generating an acceleration structure generates Morton codes including one or more pieces of information indicating the locations of the primitives and one or more pieces of information indicating the sizes of the primitives. The pieces of the information indicating the locations of the primitives includes one or more binary bits included in binary numbers indicating the x-axis coordinates of the primitives, one or more binary bits included in binary numbers indicating the y-axis coordinates of the primitives, and one or more binary bits included in binary numbers indicating the x-axis coordinates of the primitives. Also, the pieces of the information indicating the sizes of the primitives includes one or more binary bits included in binary numbers indicating the sizes of the primitives.

The apparatus 200 for generating an acceleration structure generates the Morton codes by combining the binary bits included in the binary numbers indicating the x-axis coordinates, the binary bits included in the binary numbers indicating the y-axis coordinates, the binary bits included in the binary numbers indicating the z-axis coordinates, and the binary bits included in the binary numbers indicating the sizes of the primitives in a predetermined order.

In operation 740, the apparatus 200 for generating an acceleration structure divides the primitives into the bounding boxes based on the information indicating the sizes of the primitives.

The apparatus 200 for generating an acceleration structure classifies the primitives included in the 3D space into bounding boxes including primitives having a value greater than a predetermined critical value and bounding boxes including primitives having a value smaller than the predetermined critical value.

In operation 750, the apparatus 200 for generating an acceleration structure generates the acceleration structure including an inclusion relationship between the bounding boxes.

The apparatus 200 for generating an acceleration structure classifies the primitives included in the 3D space into a first bounding box including a primitive of which a binary bit is equal to 1 and a second bounding box including a primitive of which a binary bit is equal to 0.

For example, the apparatus 200 for generating an acceleration structure may generate a first node corresponding to the first bounding box and a second node corresponding to the second bounding box. The apparatus 200 for generating an acceleration structure may add the first and second nodes to the acceleration structure as a child node of a third node corresponding to the 3D space.

Figure 8:
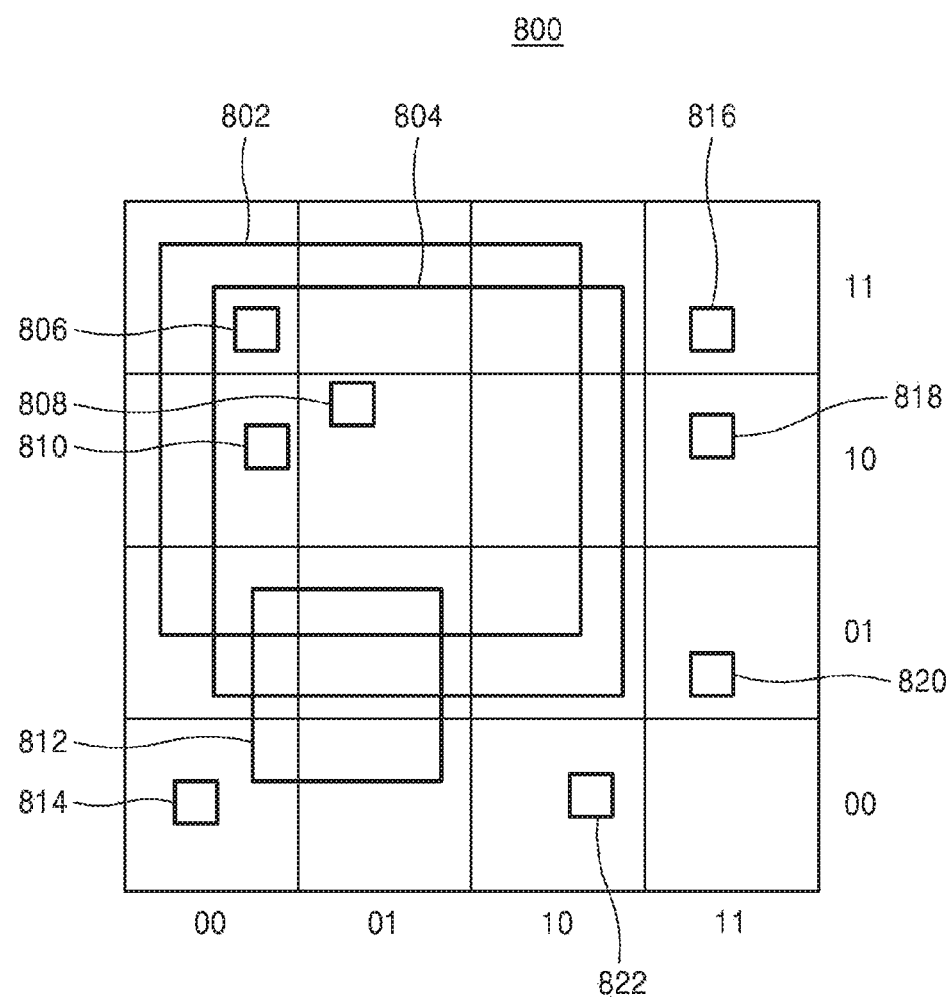
FIG. 8 is a flowchart illustrating a method of generating a Morton code according to an embodiment.

FIG. 8 is a diagram illustrating a method of generating Morton codes according to an embodiment. For convenience, a 3D space 800 is simplified as a 2D space. Though the method of generating Morton codes will be explained as being performed by the apparatus 200 of FIGS. 2 and/or 6 for generating an acceleration structure according to one or more embodiments, embodiments are not limited to the same.

The apparatus 200 for generating an acceleration structure may linearly indicate locations of primitives included in the 3D space 800 by using the Morton codes. Referring to FIG. 8, the apparatus 200 for generating an acceleration structure may equally divide each of an x-axis and a y-axis of the 3D space 800 into four sections. Therefore, the apparatus 200 for generating an acceleration structure may divide the 3D space 800 into 16 grids in total.

The apparatus 200 for generating an acceleration structure may indicate the locations of the primitives by using coordinates of the grids including primitives. The apparatus 200 for generating an acceleration structure may generate the Morton codes by combining information about the coordinates of the grids including the primitives.

For example, x-axis coordinates of a primitive 808 is 01, and y-axis coordinates thereof is 10. The apparatus 200 for generating an acceleration structure may generate the Morton codes by combining binary bits included in x-axis and y-axis coordinates of the primitives.

In this example, x-axis coordinates of a primitive may be presented as $X_1X_2$, and y-axis coordinates thereof may be presented as $Y_1Y_2$. The $X_1$, $X_2$, $Y_1$, and $Y_2$ are binary bits indicating respective digits of binary values of the x-axis and y-axis coordinates.

For example, since the x-axis coordinates of the primitive 808 are 01, and the y-axis coordinates thereof are 10, $X_1$ is 0, $X_2$ is 1, $Y_1$ is 1, and $Y_2$ is 0.

A Morton code of a primitive may be $X_1Y_1X_2Y_2$. For example, a Morton code of the primitive 808 may be 0110.

Also, when z-axis coordinates of a primitive are expressed as $Z_1Z_2$, a Morton code of the primitive may be expressed as $X_1Y_1Z_1X_2Y_2Z_2$. In this example, $Z_1$ and $Z_2$ are binary bits indicating respective digits of binary values indicating the x-axis coordinates of the primitive.

As another example, a primitive 812 is included in multiple grids. Therefore, a location of a central point of the primitive 812 is used to determine the coordinates of the primitive. X-axis coordinates of a grid where a central point of the primitive 812 is located are 01, and y-axis coordinates thereof is 01. Therefore, a Morton code of the primitive 812 may be expressed as 0011.

The apparatus 200 for generating an acceleration structure may generate Morton codes by using binary bits indicating the sizes of the primitives. For example, a size of a primitive may be expressed as $S_1S_2$. The $S_1$ and $S_2$ may be binary bits indicating respective digits of binary values indicating the size of the primitive. A Morton code of a primitive may be expressed as $X_1Y_1Z_1S_1X_2Y_2Z_2S_2$.

Referring to FIG. 8, since the 3D space 800 is simplified as a 2D space for convenience, the Morton code of the primitive may be expressed as $X_1Y_1S_1X_2Y_2S_2$. For example, a size of the primitive 808 may be 01, and a size of the primitive 812 may be 10. In this case, a Morton code of the primitive 808 may be 010101. Also, a Morton code of the primitive 812 may be 001110.

Referring to FIG. 8, an example Morton code of each primitive included in the 3D space 800 may be shown in Table 1. It is assumed that sizes of primitives 802 and 804 are 11, the size of the primitive 812 is 10, and sizes of other primitives are 01.

TABLE 1

| Primitive | x-axis coordinates | y-axis coordinates | Size | Morton code |
|---|---|---|---|---|
| 802 | 01 | 10 | 11 | 011101 |
| 804 | 01 | 10 | 11 | 011101 |
| 806 | 00 | 11 | 01 | 010011 |
| 808 | 01 | 10 | 01 | 010101 |
| 810 | 00 | 10 | 01 | 010001 |
| 812 | 01 | 01 | 10 | 001110 |
| 814 | 00 | 00 | 01 | 000001 |
| 816 | 11 | 11 | 01 | 110111 |
| 818 | 11 | 10 | 01 | 110101 |
| 820 | 11 | 01 | 01 | 100111 |
| 822 | 10 | 00 | 01 | 100001 |

Figure 9:
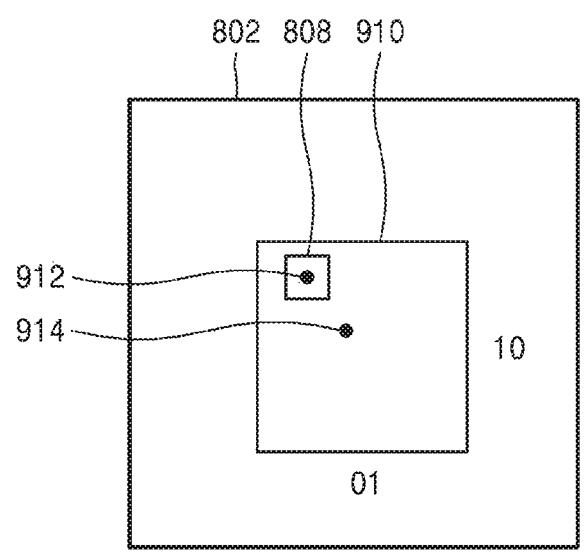
FIG. 9 is a flowchart illustrating how Morton codes are classified according to sizes of primitives according to an embodiment.

FIG. 9 is a diagram illustrating why Morton codes are classified according to sizes of primitives. FIG. 9 shows the primitives 802 and 808 and a grid 910 included in the 3D space 800. X-axis coordinates of the grid 910 is 01, and y-axis coordinates thereof is 10.

When a primitive is included in grids, the apparatus 200 for generating an acceleration structure indicates a location of the primitive based on locations of the grids where a central point of the primitive is included.

Referring to FIG. 9, the primitive 808 is included in the grid 910. Therefore, a central point 912 of the primitive 808 is also included in the grid 910. Also, a central point 914 of the primitive 802 is included in the grid 910.

If Morton codes are generated by considering the locations of the primitives only, an identical Morton code may be assigned to the primitives 802 and 808. In this case, the primitives 802 and 808 are included in the same bounding box. Thus, an inclusion relationship the primitives 802 and 808 is included. Conversely, a case in which primitives are not included in the same bounding box, the inclusion relationship would be indicated as not included.

In particular, since two primitives, that is, the primitives 802 and 808, have exactly the same Morton code, the primitives 802 and 808 are constantly included in the same bounding box until the primitives 802 and 808 reach a leaf node of the acceleration structure from a root node thereof. In this case, the primitive 808 may be included in a bounding box having an excessively great size in the entire acceleration structure.

If a size of a bounding box including a primitive is greater in comparison with a size of the primitive, it is more difficult to find the primitive during a process of traversing the acceleration structure. Therefore, an increase in the size of the bounding box in comparison with the size of the primitive may decrease the quality of the acceleration structure.

Therefore, the apparatus 200 for generating an acceleration structure may improve the quality for processing primitives, in particular, primitives having a small size, by taking the sizes of the primitives into account during the generation of the acceleration structure.

Referring to Table 1, when the Morton codes are generated by taking the sizes of the primitives into account, the Morton code of the primitive 802 is 011101, and the Morton code of the primitive 808 is 010101. Therefore, the primitive 802 and the primitive 808 are classified into different bounding boxes by using a third binary bit from a most significant bit (MSB).

Figure 10:
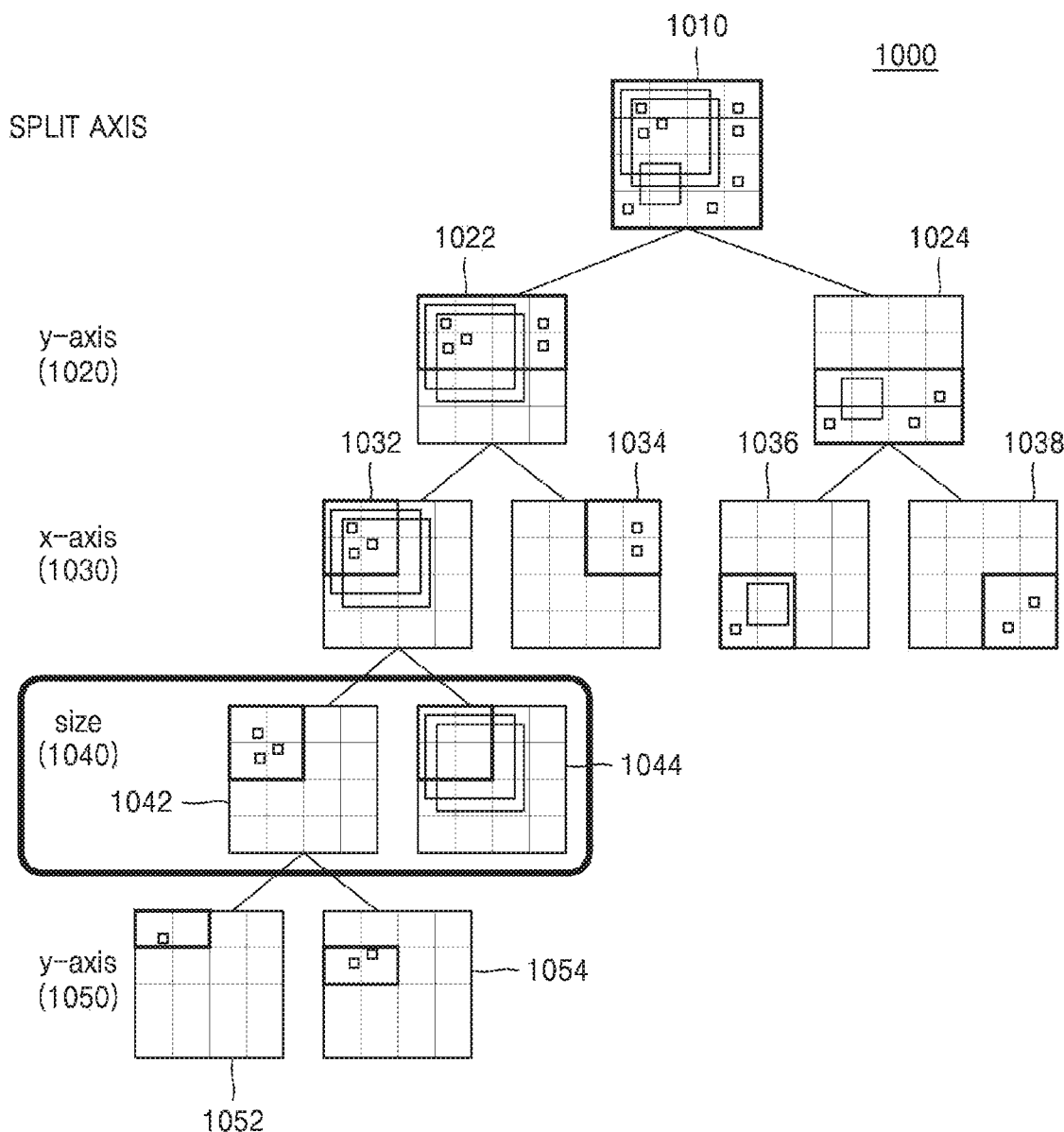
FIG. 10 is a diagram illustrating a method of generating an acceleration structure by using Morton codes generated based on sizes of primitives according to an embodiment.

FIG. 10 is a diagram illustrating a method of generating an acceleration structure 1000 by using Morton codes generated based on sizes of primitives, according to an embodiment. Though the method of generating the acceleration structure will be explained as being performed by the apparatus 200 of FIGS. 2 and/or 6 for generating an acceleration structure according to one or more embodiments, embodiments are not limited to the same.

The acceleration structure 1000 is expressed in a binary tree form, as only an example, noting that other tree formats or structures are available. The acceleration structure 1000 includes one or more nodes, and the nodes each correspond to the bounding boxes for classifying the 3D space 800.

Referring to FIG. 10, a root node 1010 corresponds to a bounding box including the entire 3D space 800. At a next level 1020 of the root node 1010, the apparatus 200 for generating an acceleration structure classifies primitives based on an MSB of a Morton code, for example.

According to the embodiment of FIG. 10, the apparatus 200 for generating an acceleration structure classifies the primitives at the level 1020 based on y-axis coordinates. Therefore, the primitives are classified into primitives having y-axis coordinates of which an MSB is 1 and primitives having y-axis coordinates of which an MSB is 0.

At the level 1020, a node 1022 corresponds to a bounding box including the primitives having the y-axis coordinates of which the MSB is 1. Also, a node 1024 corresponds to a bounding box including the primitives having the y-axis coordinates of which the MSB is 0.

At a level 1030, the apparatus 200 for generating an acceleration structure classifies the primitives based on x-axis coordinates. Therefore, the primitives are classified into primitives having x-axis coordinates of which an MSB is 1 and primitives having x-axis coordinates of which an MSB is 0.

At the level 1030, a node 1032 corresponds to a bounding box including the primitives having the y-axis coordinates of which the MSB is 1 and the primitives having the x-axis coordinates of which the MSB is 0. Also, a node 1034 corresponds to a bounding box including the primitives having the y-axis coordinates of which the MSB is 1 and the primitives having the x-axis coordinates of which the MSB is 1.

Also, at the level 1030, a node 1036 corresponds to a bounding box including the primitives having the y-axis coordinates of which the MSB is 0 and the primitives having the x-axis coordinates of which the MSB is 0. In addition, a node 1038 corresponds to a bounding box including the primitives having the y-axis coordinates of which the MSB is 0 and the primitives having the x-axis coordinates of which the MSB is 1.

At a level 1040, the apparatus 200 for generating an acceleration structure classifies the primitives based on sizes of the primitives. Accordingly, the primitives are classified into primitive sizes having 1 as the MSB and primitive sizes with 0 as the MSB.

At the level 1040, a node 1042 corresponds to a bounding box including the primitives having the y-axis coordinates of which the MSB is 1, the x-axis coordinates of which the MSB is 0, and the MSB of the size is 1. Likewise, a node 1044 corresponds to a bounding box including the primitives having the y-axis coordinates of which the MSB is 1, the x-axis coordinates of which the MSB is 0, and the MSB of the size is 0.

At a level 1050, the apparatus 200 for generating an acceleration structure classifies the primitives included in the bounding box corresponding to the node 1042 based on the y-axis coordinates. For example, the apparatus 200 for generating an acceleration structure generates a node 1052 and a node 1054 by classifying the primitives into primitives having y-axis coordinates of which a second MSB is 1 and primitives having y-axis coordinates of which a second MSB is 0.

By classifying the primitives based on the sizes thereof at the level 1040, the apparatus 200 for generating an acceleration structure generates a bounding box appropriate for a size of each primitive.

Figure 11:
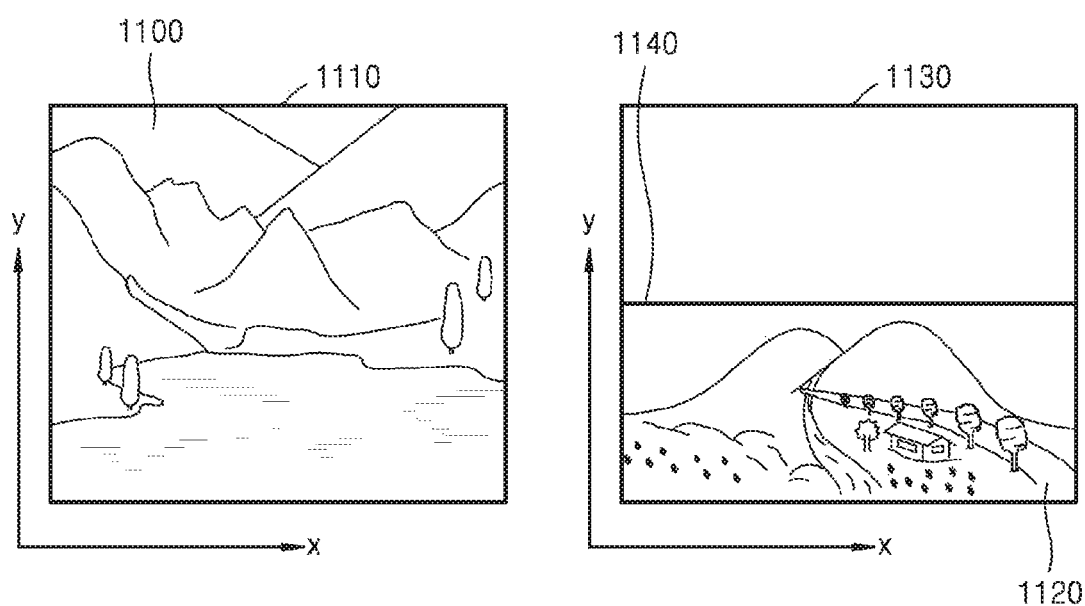
FIG. 11 is a diagram illustrating example characteristics of a three-dimensional (3D) space according to an embodiment.

FIG. 11 is a diagram illustrating a method of analyzing characteristics of a 3D space 1110 according to an embodiment. Referring to FIG. 11, the 3D space 1110 includes a high mountain 1100. In this case, the apparatus 200 for generating an acceleration structure generates an acceleration structure for the entire 3D space 1110.

For example, primitives are distributed all over the 3D space 1110. Therefore, the apparatus 200 for generating an acceleration structure generates grids for the entire 3D space 1110 and also Morton codes of the primitives.

On the other than, a 3D space 1130 includes a low mountain 1120. Therefore, most part of the 3D space 1130 is the sky. In this case, the apparatus 200 for generating an acceleration structure generates an acceleration structure for a portion 1140 of the 3D space 1130.

For example, primitives are concentrated in some portions of the 3D space 1130. Therefore, the apparatus 200 for generating an acceleration structure generates grids for the portion 1140 of the 3D space 1130 where the primitives are collected and generates Morton codes of the primitives. In this case, the number of binary bits included in coordinates of the primitive may differ from each other. Therefore, the number of binary bits included in Morton codes may also differ from each other.

For example, x-axis and y-axis coordinates of the primitives included in the 3D space 1140 are expressed as $X_1X_2X_3X_4$ and $Y_1Y_2Y_3Y_4$, and z-axis coordinates of the primitives are expressed as $Z_1Z_2$. In this case, a Morton code of a primitive are expressed as $X_1Y_1Z_1X_2Y_2Z_2X_3Y_3X_4Y_4$.

The apparatus 200 for generating an acceleration structure generates a Morton code including a size of a primitive. For example, the size of the primitive is expressed as $S_1S_2S_3$. In this case, the Morton code of the primitive may be expressed as $X_1Y_1Z_1S_1X_2Y_2Z_2S_2X_3Y_3S_3X_4Y_4$.

The number of times that the binary bits, which are included in the x-axis, y-axis, z-axis, and the sizes of the primitives to generate the Morton codes, and orders of combining the binary bits are not limited thereto. According to an embodiment, depending on distributions of the primitives included in the 3D space, optimum combinations may be experimentally determined.

Figure 12:
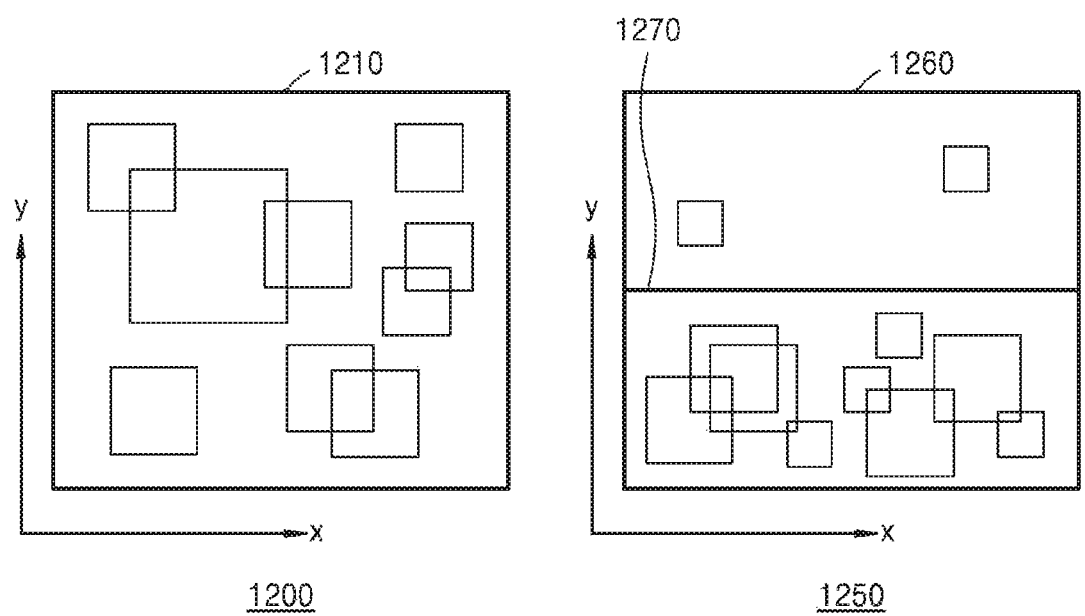
FIG. 12 is a diagram illustrating a method of analyzing characteristics of primitives included in a 3D space, according to an embodiment.

FIG. 12 is a diagram illustrating a method of analyzing characteristics of primitives included in a 3D space 1210. Referring to FIG. 12, primitives are relatively evenly distributed in the 3D space 1210, but primitives are relatively concentrated in an x-axis direction in a 3D space 1260.

The apparatus 200 for generating an acceleration structure considers distributions of the primitives when generating Morton codes. For example, when the primitives are concentrated in the x-axis direction, the apparatus 200 for generating an acceleration structure generates the Morton codes based on x-axis coordinates.

For example, the apparatus 200 for generating an acceleration structure locates binary bits included in binary numbers indicating the x-axis coordinates at significant bits of the Morton codes in comparison with other binary bits. Also, the apparatus 200 for generating an acceleration structure includes more binary bits in the binary numbers indicating the x-axis coordinates than other binary bits.

In another embodiment, the apparatus 200 for generating an acceleration structure considers sizes of the primitives included in the 3D space 1200 and 1250. For example, a difference in sizes of primitives included in 3D spaces 1200 and 1250 is not great compared to the primitives include in the 3D space 800 of FIG. 8. In FIG. 8, a distribution of sizes of primitives is greater than a distribution of sizes in FIG. 12. Therefore, when Morton codes for the primitives included in the 3D spaces 1200 and 1250 are generated, binary bits included in binary numbers indicating the sizes of the primitives are used less than in the case where the Morton codes are generated for the primitives included in the 3D space 800 of FIG. 8.

The above-described method can be written as computer programs and can be implemented in general-use digital computers that execute the programs using a computer-readable recording medium. Also, a data structure used for the above-described method may be written to a non-transitory computer-readable recording medium by using various media. Examples of the non-transitory computer-readable recording medium include magnetic storage media (e.g., ROM, floppy disks, hard disks, etc.), optical recording media (e.g., CD-ROMs, or DVDs), etc.

The apparatuses, units, modules, devices, and other components illustrated in FIGS. 1-6 that perform the operations described herein with respect to FIGS. 1-12 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. *. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described herein with respect to FIGS. 1-12 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, a terminal/device/unit as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A graphics processing method comprising:
   executing, by one or more processors, operations comprising:
   determining locations of primitives in a 3-dimensional (3D) space from graphics data for the 3D space in a memory;
   determining sizes of the primitives;
   generating Morton codes each comprising a piece of information indicating the locations of respective primitives and a piece of information indicating the sizes of respective primitives;
   classifying the primitives into bounding boxes using the piece of information indicating the sizes of the respective primitives;
   generating an acceleration structure indicating an inclusion relationship between the bounding boxes; and
   rendering image data based on the acceleration structure,
   wherein one of the pieces of information indicating the sizes of the respective primitives comprises a binary bit in binary numbers indicating the sizes of the respective primitives,
   determining the locations of the primitives comprises determining x-axis, y-axis, and z-axis coordinates of the primitives within the 3D space,
   the piece of information indicating the locations of the primitives comprises a binary bit in a binary number indicating the x-axis coordinates, a binary bit in a binary number indicating the y-axis coordinates, and a binary bit in a binary number indicating the z-axis coordinates, and
   the Morton codes are generated by combining, in order, the binary bit in the binary number indicating the x-axis coordinates, the binary number indicating the z-axis coordinates, and the binary bit in the binary number indicating the sizes of the primitives.

2. The method of claim 1, wherein the classifying of the primitives comprises
   classifying the primitives having sizes greater than a critical value into first bounding boxes and primitives having sizes less than the critical value into second bounding boxes.

3. The method of claim 1, wherein the determining of the sizes of the primitives comprises:
   determining respective sizes of the bounding boxes; and
   indicating the sizes of the primitives based on the respective sizes of the bounding boxes.

4. The method of claim 3, wherein the determining of the sizes of the bounding boxes comprises
   calculating respective diagonal lengths of the bounding boxes, and
   determining the respective sizes of the bounding boxes based on the respective diagonal lengths.

5. The method of claim 1, wherein, in the classifying of the primitives into the bounding boxes, the primitives are classified into the first bounding box comprising primitives of which the binary bit is 1 and the second bounding box comprising primitives of which the at least one binary bit is 0.

6. The method of claim 5, wherein the generating of the acceleration structure comprises:
   generating a first node corresponding to the first bounding box;

generating a second node corresponding to the second bounding box; and adding the first and second nodes to the acceleration structure as a child node of a third node corresponding to the 3D space.

7. A non-transitory computer-readable recording medium storing instructions that, when executed by one or more processors, cause the one or more processors to perform the method of claim 1.

8. A graphics processing apparatus comprising:
a memory configured to store graphics data for a 3-dimensional (3D) space;
a processor configured to:
determine locations of primitives in the 3D space from the graphics data for the 3D space in a memory;
determine sizes of the primitives;
generate Morton codes each comprising a piece of information indicating the locations of respective primitives and a piece of information indicating sizes of the respective primitives;
classify the primitives into bounding boxes based on the pieces of the information indicating the sizes of the respective primitives; and
generate an acceleration structure indicating an inclusion relationship between the bounding boxes; and
a ray tracing core configured to render image data based on the acceleration structure,
wherein the piece of information indicating the sizes of the primitives comprises a binary bit in binary numbers indicating the sizes of the primitives,
wherein the processor is further configured to determine x-axis, y-axis, and z-axis coordinates of the primitives within the 3D space, and the piece of information indicating the locations of the primitives comprises a binary bit in binary number indicating the x-axis coordinates, a binary bit in binary number indicating the y-axis coordinates, and a binary bit in binary number indicating the z-axis coordinates,
wherein the processor is further configured to generate the Morton codes by combining, in order, the binary bit in the binary number indicating the x-axis coordinates, the binary bit in the binary number indicating the y-axis coordinates, the binary bit in the binary number indicating the z-axis coordinates, and the binary bit in the binary number indicating the sizes of the primitives.

9. The apparatus of claim 8, wherein the processor is further configured to
classify the primitives in the 3D space into first bounding boxes comprising primitives having a size greater than a critical value and second bounding boxes comprising primitives having a size less than the critical value.

10. The apparatus of claim 9, wherein the processor is further configured to
determine sizes of the first or second, or both, bounding boxes and
indicate the sizes of the primitives based on the sizes of the first or second, or both, bounding boxes.

11. The apparatus of claim 10, wherein the processor is further configured to
calculate diagonal lengths of the first or second, or both, bounding boxes and
determine the sizes of the first or second, or both, bounding boxes based on the diagonal lengths.

12. The apparatus of claim 8, wherein the processor is further configured to
classify the primitives into the first bounding box comprising primitives of which the binary bit is 1 and the second bounding box comprising primitives of which the at least one binary bit is 0.

13. The apparatus of claim 12, wherein the processor is further configured to:
generate a first node corresponding to the first bounding box;
generate a second node corresponding to the second bounding box; and
add the first and second nodes to the acceleration structure as a child node of a third node corresponding to the 3D space.

14. The apparatus of claim 8, wherein the apparatus is a graphics processing unit (GPU) and further comprises one or more rendering cores.

* * * * *